United States Patent
Salter et al.

(10) Patent No.: US 10,737,613 B2
(45) Date of Patent: Aug. 11, 2020

(54) ILLUMINATED VEHICLE VISUAL ELEMENTS WITH GRATING FILM

(71) Applicant: Ford Global Technologies, LLC, Dearborn, MI (US)

(72) Inventors: Stuart C. Salter, White Lake, MI (US); Linsheng Chen, Novi, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/599,431

(22) Filed: Oct. 11, 2019

(65) Prior Publication Data

US 2020/0039430 A1 Feb. 6, 2020

Related U.S. Application Data (62) Division of application No. 15/715,929, filed on Sep. 26, 2017, now Pat. No. 10,479,270.

(51) Int. Cl.
| | |
|---|---|
| *F21V 11/12* | (2006.01) |
| *B60Q 3/20* | (2017.01) |
| *B60Q 3/80* | (2017.01) |
| *B60Q 3/82* | (2017.01) |
| *B60Q 3/225* | (2017.01) |
| *B60Q 3/10* | (2017.01) |
| *B60Q 3/66* | (2017.01) |
| *B60Q 1/32* | (2006.01) |

(52) U.S. Cl.
CPC ............... *B60Q 3/20* (2017.02); *B60Q 1/323* (2013.01); *B60Q 3/10* (2017.02); *B60Q 3/225* (2017.02); *B60Q 3/66* (2017.02); *B60Q 3/80* (2017.02); *B60Q 3/82* (2017.02)

(58) Field of Classification Search
CPC .......... B60Q 3/225; B60Q 3/20; B60Q 3/275; F21W 2106/00; F21V 11/12; F21V 11/02
See application file for complete search history.

(56) References Cited

U.S. PATENT DOCUMENTS

| | | | | |
|---|---|---|---|---|
| 1,786,155 | A | * 12/1930 | Farrell | ..................... G09F 13/06 40/580 |
| 2,068,414 | A | 1/1937 | Johnson | |
| 4,716,506 | A | * 12/1987 | Shang | ........................ F21V 9/08 359/567 |
| 4,765,724 | A | * 8/1988 | Huichun | ................. B44F 1/066 359/567 |
| 4,999,936 | A | 3/1991 | Calamia et al. | |
| 6,168,302 | B1 | 1/2001 | Hulse | |
| 6,193,399 | B1 | 2/2001 | Hulse | |
| 6,238,074 | B1 | 5/2001 | Hulse et al. | |
| 6,896,387 | B2 | 5/2005 | Renfro | |
| 8,353,604 | B2 | 1/2013 | Glazier | |
| 8,960,944 | B2 | 2/2015 | Foo | |
| 9,068,708 | B2 | 6/2015 | Antilla et al. | |

(Continued)

*Primary Examiner* — Ismael Negron
(74) *Attorney, Agent, or Firm* — David Coppiellie; Price Heneveld LLP (57) ABSTRACT

A vehicle visual element includes a substrate defining a lamp cavity; at least one light source positioned within the lamp cavity; at least one of a holographic and a diffraction grating, disposed over the lamp cavity; a proximity switch positioned close to the lamp cavity; and a controller configured to activate the light source in response to a signal provided by the proximity switch.

20 Claims, 8 Drawing Sheets

(56) References Cited

U.S. PATENT DOCUMENTS

| | | |
|---|---|---|
| 9,751,460 B1 | 9/2017 | Iordache et al. |
| 9,809,161 B1 | 11/2017 | Salter et al. |
| 2006/0016109 A1 | 1/2006 | Nicolaas |
| 2006/0097121 A1 | 5/2006 | Fugate |
| 2006/0274540 A1 | 12/2006 | Klaver et al. |
| 2009/0134793 A1* | 5/2009 | Cseh .................. H01J 61/025 313/580 |
| 2012/0075842 A1 | 3/2012 | Goto |
| 2018/0011324 A1 | 1/2018 | Popovich |

* cited by examiner

ILLUMINATED VEHICLE VISUAL ELEMENTS WITH GRATING FILM

CROSS-REFERENCE TO RELATED APPLICATION

This application is a divisional of U.S. patent application Ser. No. 15/715,929, filed on Sep. 26, 2017, entitled "ILLUMINATED VEHICLE CUP HOLDER WITH GRATING FILM," the entire disclosure of which is hereby incorporated by reference.

FIELD OF THE INVENTION

The present disclosure generally relates to visual elements, and more particularly, to illuminated vehicle visual elements.

BACKGROUND OF THE INVENTION

Illumination systems used in vehicles may offer a unique and attractive viewing experience. It therefore may be desirable to incorporate such illumination systems in portions of vehicles to provide accent and functional lighting.

SUMMARY OF THE INVENTION

According to at least one example of the present disclosure, a vehicle visual element includes a substrate defining a lamp cavity. A light source is positioned within the lamp cavity which is configured to emit light. A film defining at least one of a holographic and a diffraction grating is disposed over the lamp cavity.

According to another example of the present disclosure, a vehicle cup holder includes a console substrate defining a cup well. A lamp cavity is positioned below the cup well. A film positioned between the cups well and the lamp cavity defines at least one grating. A light source is positioned within the lamp cavity which is configured to emit light onto the film.

According to another example of the present disclosure, a method of operating a vehicle visual element, comprises the steps of: emitting light in a first pattern from a light source onto a film defining a grating; generating a projected image having a first characteristic from the light of the first pattern through film interacting with the grating; and emitting light in a second pattern onto the film to form the projected image having a second characteristic.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring now to FIGS. 1A-6, reference numeral 10 generally designates a vehicle. The vehicle 10 includes a vehicle visual element 14. The visual element 14 may include a substrate 18 defining a lamp cavity 22. One or more light sources 26 are positioned within the lamp cavity 22 and are configured to emit light. A film 30, defining at least one grating 34 is disposed over the lamp cavity 22.

Figure 1A:
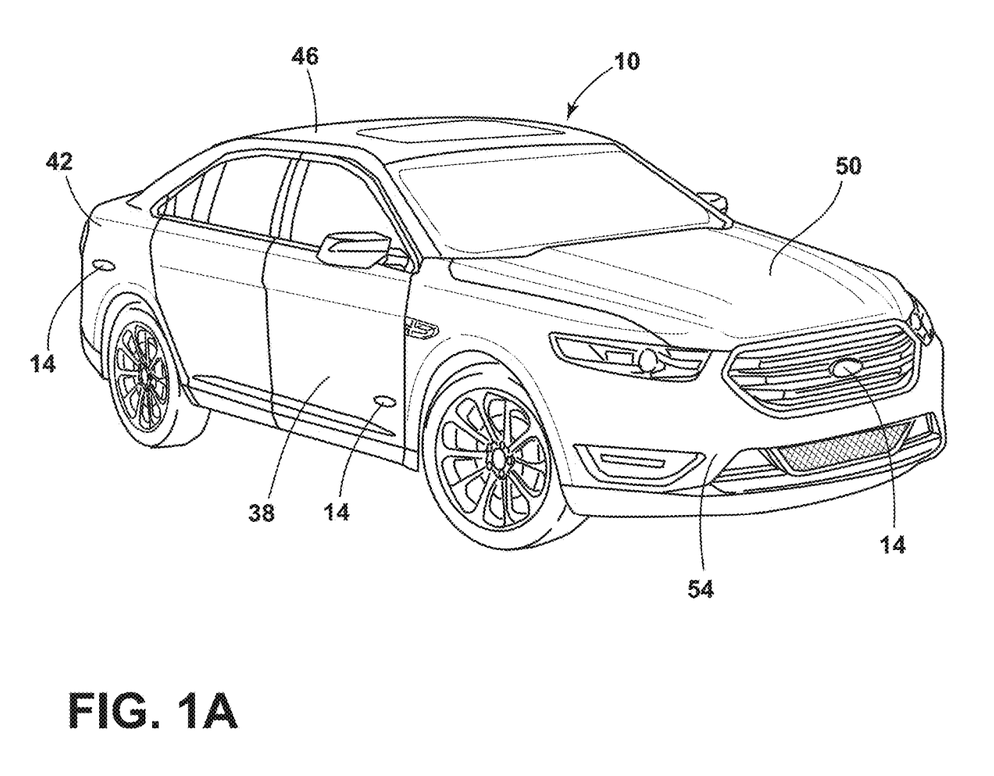
FIG. 1A is a perspective view of an exterior of a vehicle, according to at least one example.
Figure 1B:
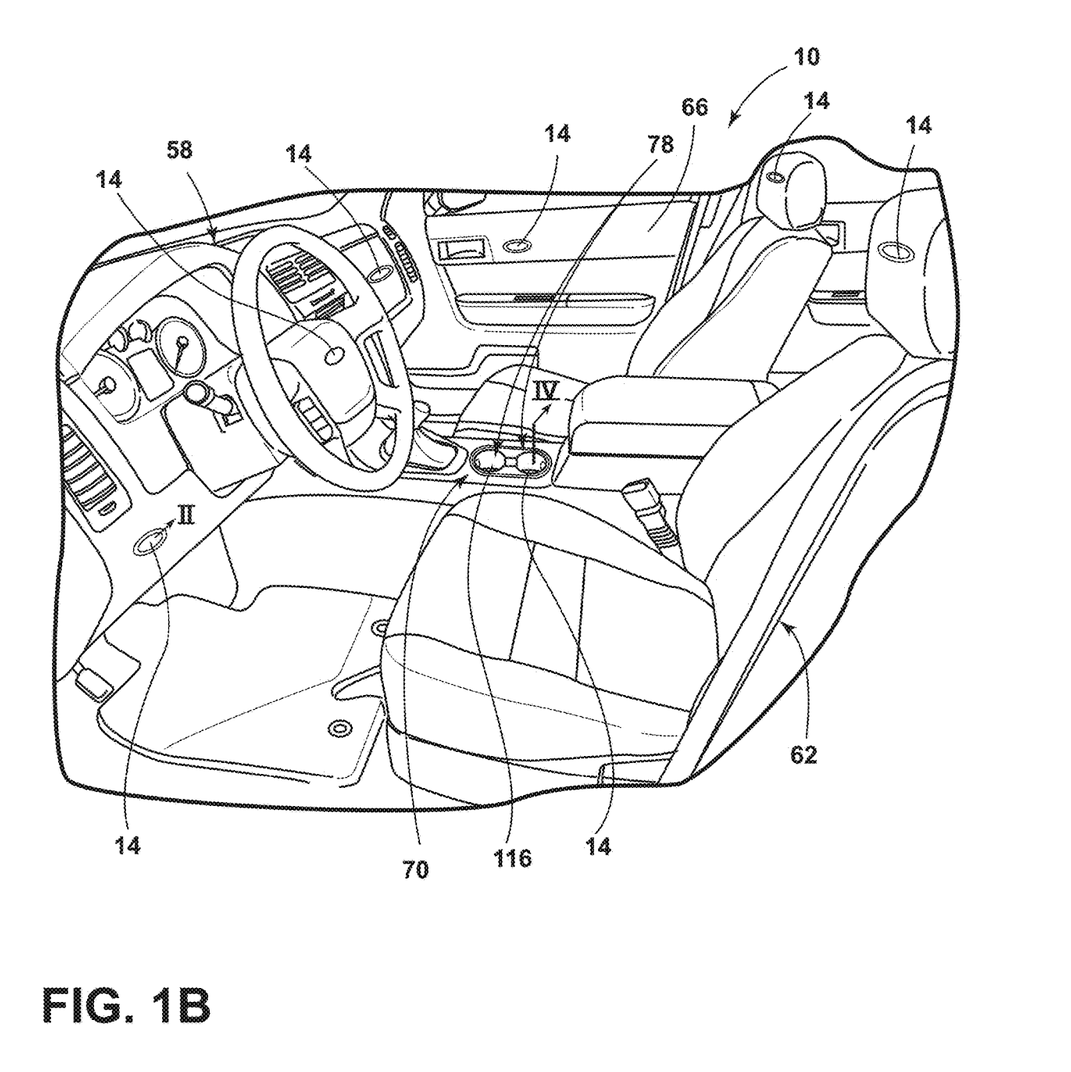
FIG. 1B is a perspective view of an interior of a vehicle, according to at least one example.

Referring now to FIGS. 1A and 1B, the vehicle 10 includes a plurality of exterior surfaces and a plurality of interior surfaces. Exemplary exterior surfaces of the vehicle 10 may be defined by a door panel 38, a quarter-panel 42, a roof 46, a hood 50, a bumper 54 (e.g., front and/or rear bumpers) and/or other components positioned around the exterior of the vehicle 10. Exemplary interior surfaces of the vehicle 10 include instrument panels 58, seating assemblies 62, trim pieces 66, center consoles 70 and other surfaces within the interior of the vehicle 10. Each of the surfaces is defined by the substrate 18 (e.g., plastic, metal, fabric, glass, etc.) which forms the surface. It will be understood that various substrates 18 may be composed of one or more material while still being the substrate 18. The vehicle 10 may include one or more visual elements 14 positioned on any of the interior and/or exterior surfaces listed above. In some examples, the visual element 14 may be part of a larger or smaller structure such as a cup holder 78. In yet other examples, the visual element 14 may be a standalone badge, logotype, switch and/or aesthetic element.

The vehicle 10 may include one or more cup holders 78. In the depicted example, the cup holders 78 are positioned in the center console 70, but it will be understood that the cup holders 78 may be positioned in a variety of locations within the vehicle 10. For example, the cup holders 78 may be positioned on a door and/or on the instrument panel 58. Additionally or alternatively, the cup holders 78 may be positioned proximate a rear seat of the vehicle 10 in a rear center console (e.g., foldable), rear doors, seat backs or other areas in a rear of the vehicle 10. Although depicted as including two cup holders 78, it would be understood that a single cup holder 78 or more than two cup holders 78 may be utilized with the vehicle 10.

Figure 2:
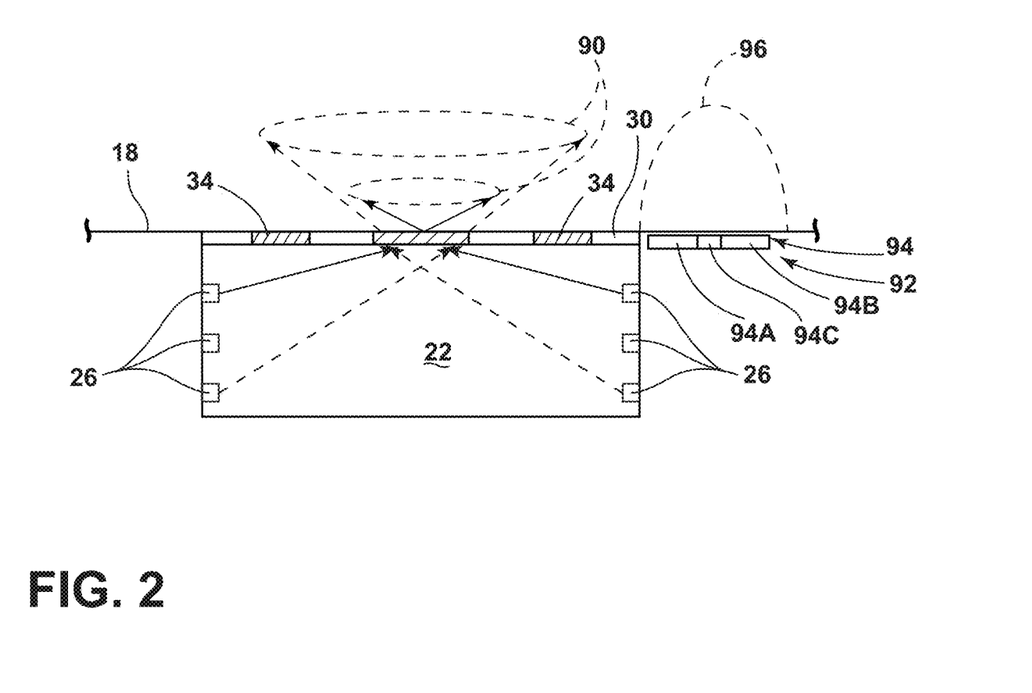
FIG. 2 is a cross-sectional view taken at line II of FIG. 1B, according to at least one example.

Referring now to FIG. 2, each of the visual elements 14 includes the substrate 18, the lamp cavity 22, the film 30 and the light sources 26. As explained above, the substrate 18 may be a component of a variety of interior and/or exterior components of the vehicle 10. As such, the visual element 14 may be positioned on an exterior or an interior of the vehicle 10. In the depicted example, the substrate 18 integrally defines the lamp cavity 22, but it will be understood that the lamp cavity 22 may be defined by the substrate 18 through one or more separate structures coupled to the substrate 18. Further, the lamp cavity 22 may be defined by the substrate 18 in a different material than the rest of the substrate 18. For example, the substrate 18 may substantially be fabric (e.g., in seat assembly 62 examples) while the lamp cavity 22 is defined by a polymeric components of the substrate 18.

The lamp cavity 22 is a well in which one or more of the light sources 26 are positioned or otherwise optically coupled. The depicted example, the light sources 26 are positioned alongside surfaces of the lamp cavity 22, but it will be understood that the light source 26 may additionally or alternatively be positioned along a bottom of the lamp cavity 22. In other examples, one or more light guides may be utilized to transmit light to the lamp cavity 22 from remote light sources 26. The light sources 26 may be positioned in a spaced apart configuration around a perimeter of the lamp cavity 22 and/or may form a continuous or semi-continuous band of light sources 26 around the lamp cavity 22. The light sources 26 may be vertically stacked relative to one another. In other words, the light sources 26 may be spread along a height of the lamp cavity 22.

The light sources 26 may be incandescent bulbs, light-emitting diodes, electroluminescent light sources, printed light sources and/or combinations thereof. According to various examples, the light sources 26 may be red-blue-green light-emitting diodes capable of emitting colors of lights ranging from red, blue, green and/or combinations thereof. The light sources 26 may be capable of emitting white, colored, nonvisible (e.g., ultraviolet and/or infrared), coherent and/or incoherent light into and around the lamp cavity 22. In some examples, the lamp cavity 22 may have a reflective film or coating disposed around a perimeter of the cavity 22 to aid in the reflection of light. The light sources 26 may have a 120° pattern.

The light sources 26 are configured to emit light toward the film 30. As a viewer of the visual elements 14 is positioned on an opposite side of the film 30 than the light sources 26, the film 30 is backlit relative to the viewer. Such a feature may be advantageous in eliminating hotspots in the lighting of the film 30. In some examples, the light sources 26 may each be independently operable, while in other examples one or more of the light sources 26 may be grouped to function together. For example, the light sources 26 may be horizontally grouped in functionality. An example of such a configuration may be that the top light sources 26 are configured to function (e.g., both emit light at the same time) together while the bottom light sources 26 emit light at the same time. Further, grouped light sources 26 may be activated in different colors to control color mixing of the light (i.e., to illuminate the film 30 in a desired color). As will be explained in greater detail below, such a feature may be advantageous in adjusting the illumination of the gratings 34 of the film 30. Grouping and/or simultaneous activation of the light sources 26 may allow for various patterns of illumination to be projected onto the film 30 which may function to illuminate the gratings 34 in a different manner.

The film 30 is positioned or disposed over the lamp cavity 22. Further, the film 30 is positioned between the light sources 26 and a viewer of the visual element 14 such that the film 30 is backlit. The film 30 may be freestanding, or may be optionally coupled to one or more optically translucent, transmissive or transparent substrates. The film 30 may be composed of polyethylene terephthalate, orientated polypropylene and/or polyvinyl chloride materials. The film 30 may be metalized or transparent. For example, a portion, a majority or substantially all of the film 30 may be translucent, transmissive and/or transparent. 30 may be partially transmissive. In some examples, the film 30 may form an indicia. The indicia may be alphanumeric text, a symbol, a picture, a logo or other image or text. The indicia may be formed via one or more pigments or dyes, or may be constructed from varying the transmissivity of the film 30 in various locations. The film 30 may have a density of between about 70 grams per meter square (GSM) and about 450 GSM.

The film 30 may define one or more gratings 34. The gratings 34 may be a holographic grating 34 and/or a diffraction grating 34. The gratings 34 of the film 30 may be formed by defining one or more features configured to form an interference pattern. The features of the grating 34 may be ridges, variations in opacity, density or surface profile. Light from the light sources 26 falling on the gratings 34 diffracts into a light field which forms a projected image 90. The projected image 90 may also be known as a hologram. The light field which forms the projected image 90 may exhibit visual depth queues such as parallax and perspective that change realistically with any change in the relative position of the observer (e.g., an occupant within an interior of the vehicle 10). As the projected image 90 exhibits a depth and changes with changing perspective of the observer, the projected image 90 is a hologram. The projected image 90 may appear to "float" or "hover" over the film 30. Use of examples of the visual element 14 which incorporate multiple light sources 26 may be advantageous in providing a uniform appearance to the projected images 90 regardless of viewing perspective of the observer. In other words, a skewing of the projected image 90 based on the lighting might not occur, or be apparent to the viewer. Further, use of multiple light sources 26 may allow for the projected image 90 to change in intensity and/or color and may also simulate movement of the projected image 90.

The projected image 90 may take a variety of configurations including alpha numeric text, symbols (e.g., a cup holder symbol, vehicle make or model symbols, star pattern, etc.), as well as pictures. The light emitted from the light sources 26 may be emitted in a variety of patterns configured to produce different characteristics of the projected image 90. Accordingly, changing the lighting pattern from the light sources 26 may change characteristics of the projected image 90. For example, a projected image 90 may be generated having a first characteristic (e.g., color, shape, intensity, size, movement, etc.) from the light of the first lighting pattern and the projected image 90 may be changed to have a second characteristic (e.g., a different color, shape, intensity, size, etc.) by emitting light from the light sources 26 in a second lighting pattern onto the film 30. It will be understood that although other aspects of the lighting may remain constant, emitting light from different groups of light sources 26 may constitute a difference between the first and second lighting patterns. The projected image 90 may exhibit the color of the light emitted from the light sources 26. As such, changing the color of the lighting patterns may change the color of the project image 90. When the light sources 26 are set to a white color, the projected image 90 may have rainbow effect due to diffraction. The projected image 90 may appear different from different angles and from examples utilizing differently oriented or differently colored light sources 26. For example, the intensity or color of the projected image 90 may vary based on the observer's position relative to the visual element 14. The intensity of the projected image 90 may be increased or decreased by a corresponding increase or decrease in light (e.g., different lighting patterns) from one or more of the light sources 26. As explained above, the light sources 26 may be grouped such that pairs (e.g., or more) of the light sources 26 may be activated in unison or sequentially. Activating of the top light sources 26 may have the effect of creating a smaller projected image 90 relative to a projected image 90 formed from the activating of the bottom light sources 26 (e.g., different lighting patterns). As such, altering which light sources 26 are activated may adjust the size of the projected image 90.

According to various embodiments, altering the activation of the light sources 26 may be configured to give the projected image 90 the appearance of movement. For example, by activating the light sources 26 in an alternating manner, the projected image 90 may be skewed in an alternating manner giving the appearance of movement. Further, a different projected image 90 may be formed by the activation of each light source 26 such that the projected image 90 appears to be moving around film 30 of the visual element 14. It will be understood that the film 30 may define more than one holographic example of the grating 34 such that a plurality of projected images 90 are formed. In such an example, the projected image 90 may change based on which light source 26 is activated or multiple projected images 90 may be visible at once. Based on the lighting from the light sources 26, the projected image 90 may provide a 120° cone of image stand off from the visual element 14 and/or the film 30.

According to various examples, the visual element 14 may include a proximity switch assembly 92. As will be explained in greater detail below, examples of the visual element 14 which include a proximity switch assembly 92 may allow the visual element 14 to function as a switch to control one or more features of the vehicle 10. The visual element 14 may include a single proximity switch assembly 92 or a plurality of proximity switch assemblies 92. In the depicted example, the proximity switch assembly 92 is positioned to a side of the lamp cavity 22, but it will be understood that one or more of the proximity switch assemblies 92 may be positioned within the lamp cavity 22 (e.g., against the film 30) and/or out outside of the visual element 14. The proximity switch assembly 92 may include a single proximity sensor or a plurality of proximity sensors. The sensor(s) may be configured to control one or more control outputs corresponding to a system or a device of the vehicle 10. For example, the sensor may control the light provided by the light sources 26 or may control such features of the vehicle 10 as window up/down, mirror adjustment, door locks, cruise control, volume, trip information, heads-up display adjustments, radio controls (e.g., seek, scan, media choice), air conditioning, fan speed, defrost and clock adjustment. In examples of the vehicle 10 where the visual element 14 is positioned on an exterior of the vehicle 10, the visual element 14 (e.g., through the proximity sensors of the proximity switch assembly 92) may be used as an entry keypad, a locking feature, truck or tailgate activation, hood release and/or other functions related to exterior and/or interior features of the vehicle 10.

In some examples, the proximity sensors may be implemented as capacitive sensors, but it will be understood that other types of proximity sensors may be used in addition to and/or alternatively to any other practicable sensor. Other examples of the proximity sensors of the proximity switch assembly 92 may include, but are not limited to, magnetic sensors, inductive sensors, optical sensors, resistive sensors, temperature sensors, the like, or any combination thereof.

Capacitive sensors detect changes in capacitance due to the placement or movement of an object such as a finger proximate to or in contact with the visual element 14. A user's finger may tap or swipe on or near the visual element 14 to input a switching event. The proximity switch assembly 92 may be formed by a first portion 94A and a second portion 94B of a conductive layer 94. An insulative layer 94C is positioned between the first and second portions 94A, 94B. Capacitive sensors may be actuatable with substantially no force to realize switch activation. The actual sensitivity of this type of switch can be tuned via a detection circuit. Capacitive switches beneficially provide immunity to interference and eliminate the need for electromechanical switch gear (e.g., pushbuttons or sliding switches).

The proximity switch assembly 92 is configured to emit an electromagnetic field 96. The electromagnetic field 96 extends outwardly from the visual element 14. According to various examples, the sensors of the proximity switch assembly 92 are activated when an object such as a finger proximate to or in contact with the visual element 14 interferes with the electromagnetic field 96. The electromagnetic field 96 may extend over the projected image 90. The distance which the electromagnetic field 96 extends may be tuned.

In operation, the projected image 90 may be configured to indicate to the observer or occupant of the vehicle 10 the location which needs to be touched in order to trigger the proximity switch assembly 92 (e.g., to make the visual element 14 function as a switch). For example, the projected image 90, as explained above, may graphically represent the electromagnetic field lines of the electromagnetic field 96 such that it is clear to an observer where the activation space for the proximity switch assembly 92 is and where it is not. In other words, the projected image 90 may be displayed within the electromagnetic field 96. In such an example, a printed indicia (e.g., film or paint) may be positioned on top of the film 30 to indicate the function of the visual element 14. In another example, the projected image 90 may correspond to a graphical depiction of the function of the visual element 14. For example, an air conditioner example of the visual element 14 may be represented by the projected image 90 of "A/C" or a fan speed example of the visual element may be represented by a fan shape for the projected image 90. In such examples, the projected image 90 may still serve to indicate to a user of the visual element 14 how close their finger needs to be to activate the element 14. For example, the film 30 may be configured to create the projected image 90 at a farthest operable distance for the visual element 14 (e.g., the farthest the electromagnetic field 96 or the activation area extends). In other words, the user of the visual element 14 need only "touch" the projected image 90 to be close enough (e.g., within the electromagnetic field 96) to activate the visual element 14. In yet other examples, the triggering of the proximity switch assembly 92 may serve to dynamically change the aesthetics of the visual element 14. For example, by triggering the proximity switch assembly 92, the projected image 90 may have one or more characteristics (e.g., color, movement, shape, size, image, distance from the film 30, etc.) changed. By changing an aesthetic characteristic of the project image 90, a visual confirmation may be provided to the user that the proximity switch assembly 92 has been actuated (e.g., that a vehicle feature has been changed). As explained above, such changes in the characteristics of the projected image 90 may be carried out by altering the lighting pattern emitted from the light sources 26 (e.g., which light sources 26 are activated and/or in which color). In other words, triggering the proximity switch assembly 92 may change the illumination pattern provided by the light sources 26 in the lamp cavity 22.

The film 30 may have a generally curved shape, a flat shape, a square shape, a rectangular shape, a polygonal shape, an undulating shape, or other complex shape. For example, one or more locations of an exterior surface (e.g., opposite the lamp cavity 22) of the film 30 may be faceted, non-planar, curved or characterized by other shapes. The film 30 may define a plurality of spaces between the gratings 34 which remain substantially transparent to ambient light and/or the light from the light sources 26. Faceted examples of the film 30, in addition to the use of diffraction examples of the grating 34, may provide the film 30 with a jewel-like appearance. For example, the plurality of diffraction gratings 34 may have a different period, range of periods, and/or shape, such that the iridescence of the film 30 appears random and more jewel like. The spaces and the diffraction gratings 34 may be strategically positioned to cooperate with the shape of the film 30 to create a more jewel-like appearance. It will be understood that diffraction and holographic examples of the gratings 34 may be used in conjunction with one another or be utilized separately.

Figure 3A:
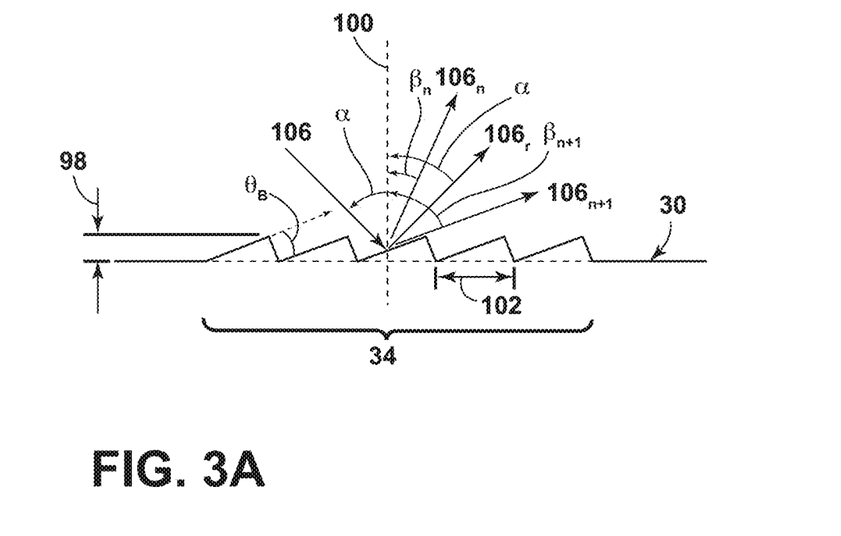
FIG. 3A is an enhanced view of a grating, according to at least one example.
Figure 3B:
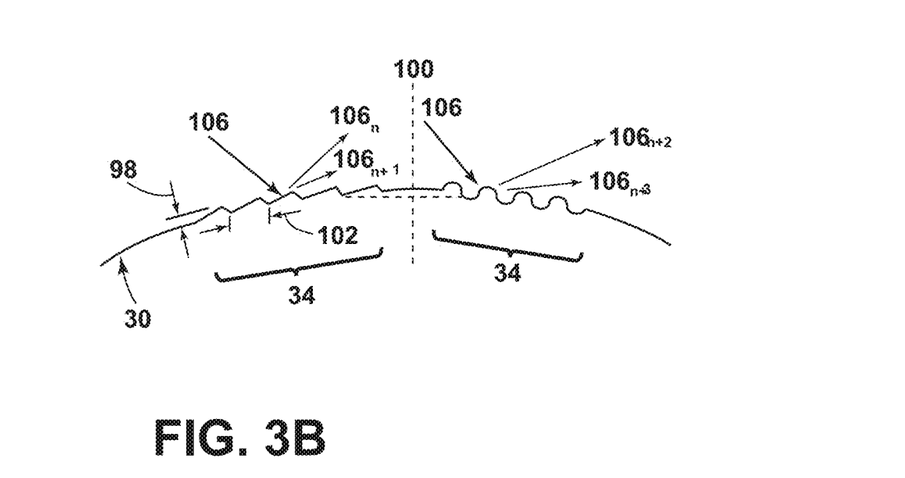
FIG. 3B is an enhanced view of a grating, according to at least one example.

Referring now to FIGS. 3A and 3B, the diffraction examples of the grating 34 are configured to produce an iridescent pattern to light impinging upon it. The diffraction grating 34 may be present on a flat example of the film 30 (FIG. 3A) on a curved embodiment of the film 30 (FIG. 3B), or on other shapes of the film 30. For example, the diffraction grating 34 may be configured to reflect light of different wavelengths in different directions. The diffraction grating 34 may have a thickness 98 that ranges from about 250 nm to about 1000 nm. The thickness 98 of the diffraction grating 34, for example, should be maintained in the range of about 250 nm to about 1000 nm to ensure that the film 30 exhibits a jewel-like appearance through light diffraction upon illumination in direct ambient lighting while also having a minimal effect on the optical clarity of the film 30 under non-direct ambient lighting. Preferably, the thickness 98 of the diffraction grating 34 ranges from about 390 nm to 700 nm. In other examples, the thickness 98 of the diffraction gratings 34 ranges from 500 nm to 750 nm. As depicted in FIG. 3A in exemplary form, the diffraction grating 34 may have a sawtooth or triangular shape. In three dimensions, these gratings 34 can appear with a stepped or sawtooth shape without angular features, pyramidal in shape, or some combination of stepped and pyramidal shapes. Other shapes of the diffraction example grating 34 include hill-shaped features (e.g., sinusoidal or curved shaped features). The diffraction example grating 34 can also include portions with a combination of triangular and hill-shaped features. More generally, the shapes of the grating 34 should be such that an effective blazing angle $\theta_B$ of at least 15 degrees is present for one or more portions of each grating, tooth or groove of the diffraction example grating 34. The blaze angle $\theta_B$ is the angle between step normal (i.e., the direction normal to each step or tooth of the grating 34) and a direction normal 100 to the film 30 having the diffraction grating 34.

Generally, the blaze angle $\theta_B$ is optimized to maximize the efficiency of the incident light which may be typical ambient sunlight, light from the light sources 26, to ensure that maximum optical power is concentrated in one or more diffraction orders while minimizing residual power in other orders (e.g., the zeroth order indicative of the ambient light itself). An advantage of situating the diffraction example gratings 34 on planar portions or aspects of film 30 is that a constant blaze angle $\theta_B$ and a period 102 will result in consistent reflected and diffracted light produced from the diffraction example grating 34.

The diffraction example grating 34 of the film 30 may be characterized by one or more periods 102 (also known as d in the standard nomenclature of diffraction gratings). In most aspects of the film 30, the period 102 of the diffraction grating 34 is maintained between about 50 nm and about 5 microns. In general, the maximum wavelength that a given diffraction grating 34 can diffract is equal to about twice the period 102. Hence, a diffraction grating 34 with the period 102 that is maintained between about 50 nm and about 5 microns can diffract light in an optical range of 100 nm to about 10 microns. In at least one example, the period 102 of the diffraction grating 34 is maintained from about 150 nm to about 400 nm, ensuring that the diffraction grating 34 can efficiently diffract light in an optical range of about 300 nm to about 800 nm, roughly covering the visible spectrum.

Incident light 106 (typically ambient, sun light and the phosphorescent light) at an incident angle $\alpha$ is directed against a sawtooth-shaped diffraction grating 34 having a thickness 98, a period 102 and a blaze angle $\theta_B$. More particularly, a portion of the incident light 106 (e.g., a small portion) striking the diffraction grating 34 at an incident angle $\alpha$ is reflected as reflected light 106r at the same angle $\alpha$, and the remaining portion of the incident light 106 is diffracted at particular wavelengths corresponding to diffracted light $106n$, $106_{n+1}$, etc., at corresponding diffraction angles $\beta n$, $\beta n+1$, etc. The reflected light 106r is indicative of the zeroth order (i.e., n=0) and the diffracted light $106_n$, $106_{n+1}$, $106_{n+2}$ are indicative of the nth order diffraction according to standard diffraction grating terminology, where n is an integer corresponding to particular wavelengths of the reflected or diffracted light.

Figure 3C:
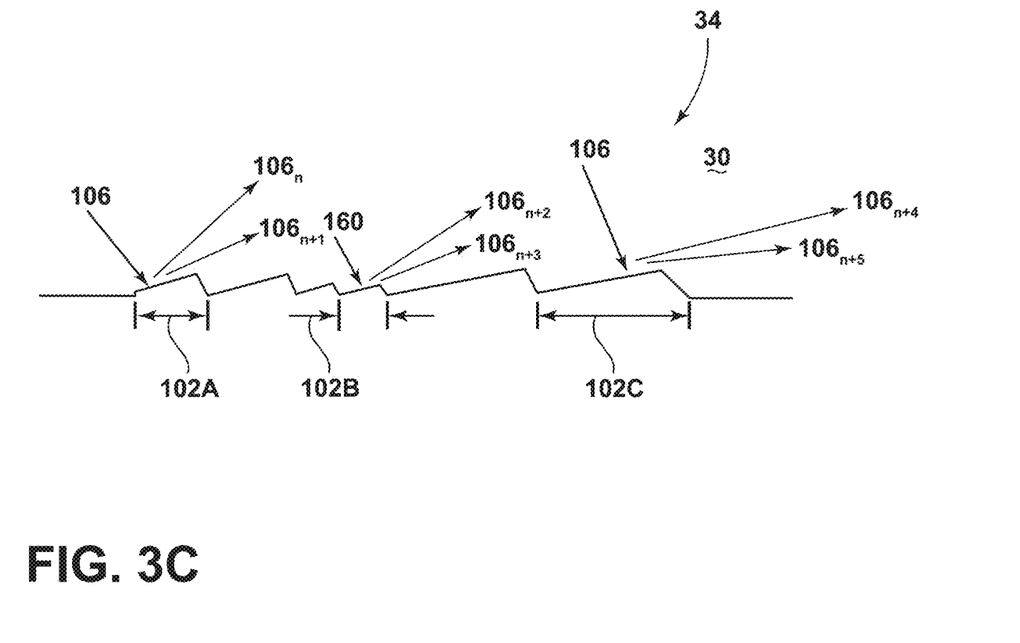
FIG. 3C is an enhanced view of a grating, according to at least one example.

Referring now to FIG. 3C, an example of the diffraction grating 34 employing varying periods 102 (e.g., as including a set of periods) that can be employed in the film 30 is depicted in a cross-sectional form. In the depicted example, the diffraction grating 34 can have two or more sets of teeth or grooves, each having a particular period 102 that can produce light at unique or differing diffraction orders. As shown, the grating 34 is configured with three periods— period 102A, period 102B, and period 102C. One set of teeth of the diffraction grating 34 with a period of 102A can produce diffracted light $106_n$ and $106_{n+1}$, a different set of teeth with a period of 102B can produce diffracted light $106_{n+2}$ and $106_{n+3}$, and a third set of teeth with a period of 102C can produce diffracted light $106_{n+4}$ and $106_{n+5}$, all from the same incident light 106. Consequently, the diffraction grating 34, whether employed on interior or exterior surfaces of the film 30, advantageously can produce jewel-like effects of widely varying wavelengths within various regions of the film 30.

The diffraction and holographic examples of the gratings 34 may be formed into the film 30 in a variety of ways. For example, a chemical based laser may etch a mold or press used for forming the film 30, with the diffraction and holographic gratings 34. The material of the film 30 may flow into the etchings and thereby form the diffraction and holographic gratings 34 on the film 30.

In some aspects, the diffraction grating 34 includes a varying period that varies between two to ten discrete values or, more preferably, between two to five discrete values across the diffraction grating 34. According to another aspect, the diffraction grating 34 with varying periods can be employed in one or more portions of the film 30, and one or more diffraction gratings 34 having a constant period are employed in other portions of the film 30 to create interesting, jewel-like appearance effects produced by the film 30 employing the gratings 34. In another example, the diffraction grating 34 includes a varying period that changes between any number of values, only limited by the overall length of the grating 34 and/or the processing capabilities to develop such variability through precise control of mold dimensions. In another example there may be a plurality of diffraction gratings 34 in a spaced apart configuration across the film 30. In such an example, the plurality of diffraction gratings 34 may have the same or a different period. In yet another embodiment, the diffraction grating(s) 34 may substantially cover the interior or exterior surfaces of the film 30. In examples where diffraction gratings 34 are present on the interior surface (e.g., proximate the lamp cavity 22) of the film 30, the diffraction taking place on the interior surface may provide an aesthetically pleasing "depth" to the film 30.

In some examples, optional coatings may be applied over the interior surface and/or exterior surface of the film 30. For example, an optically clear sealing layer (e.g., a polyurethane seal) can be applied over the film 30 to add further mechanical and/or ultraviolet light protection to the film 30, particularly to any gratings 34 defined by the film 30. Advantageously, the addition of a relatively thin protective coating can protect the gratings 34.

Figure 4:
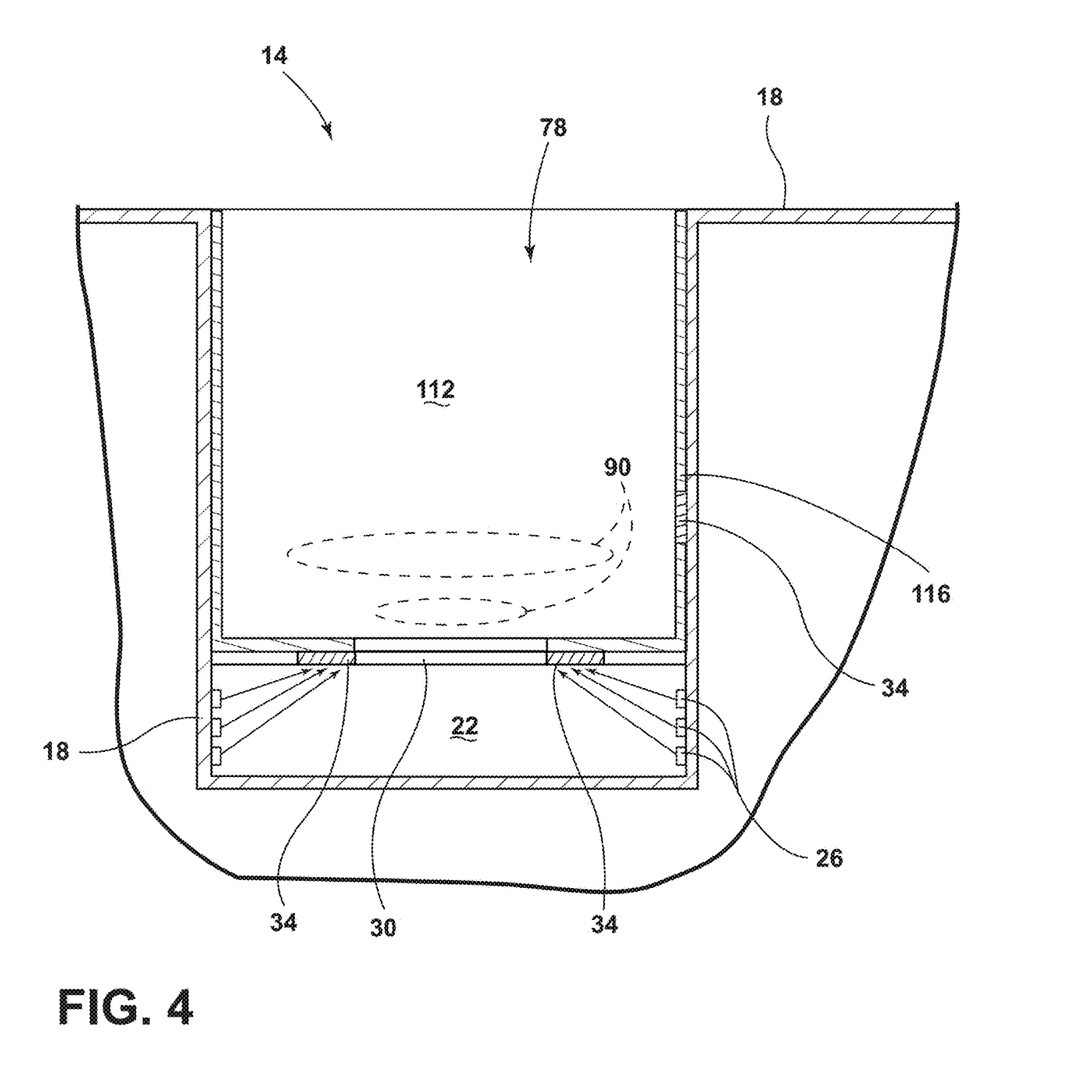
FIG. 4 is a cross-sectional view taken at line IV of FIG. 1B, according to at least one example.

Referring now to FIG. 4, depicted is an example of the cup holder 78. In the depicted example, the substrate 18 defines a cup well 112 in addition to the lamp cavity 22. In the depicted example, the cup well 112 and the lamp cavity 22 are separated by the film 30. An insert 116 may be positioned within the cup well 112. In the depicted configuration, the projected image 90 and/or the jewel-like diffraction form the gratings 34 may be visible within the cup well 112 and/or through the insert 116. In other words, the film 30 may create the projected image 90 within the cup well 112. In the depicted example, the insert 116 is positioned over the film 30, but it will be understood that the insert 116 may be coupled with the film 30. Further, an optical coupling adhesive may be positioned between the film 30 and the insert 116. The insert 116 may define one or more of the gratings 34. The gratings 34 may be the holographic gratings 34 and/or the diffraction gratings 34. The gratings 34 may be defined along interior and/or exterior surfaces (e.g., against the substrate 18) of the insert 116. The insert 116 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof. In a specific example, the insert 116 may be molded and be formed of silicone. The insert 116 may be opaque, translucent, or substantially transparent. The insert 116 may have a transparency to light in a visible spectrum (e.g., about 400 nm to about 700 nm) of greater than about 50%, 60%, 70%, 80%, 90% or 99%. In some examples, the insert 116 may include a colorant (e.g., to color or filter the light passing through or being reflected off of the insert 116), an ultra violet inhibitor or blocker (e.g., a hindered amine or benzoyl).

The interior surface of the insert 116 may have a generally curved shape, as depicted, or may have a flat, square, rectangular, polygonal, undulating, or other complex shape. For example, one or more locations of the interior surface of the insert 116 may be faceted, non-planar, curved or characterized by other shapes. According to various examples, the insert 116 may define holographic and/or diffraction gratings 34 on the interior and/or exterior surfaces of the insert 116. Such features may provide an aesthetically pleasing jewel-like surface to the insert 116.

Figure 5:
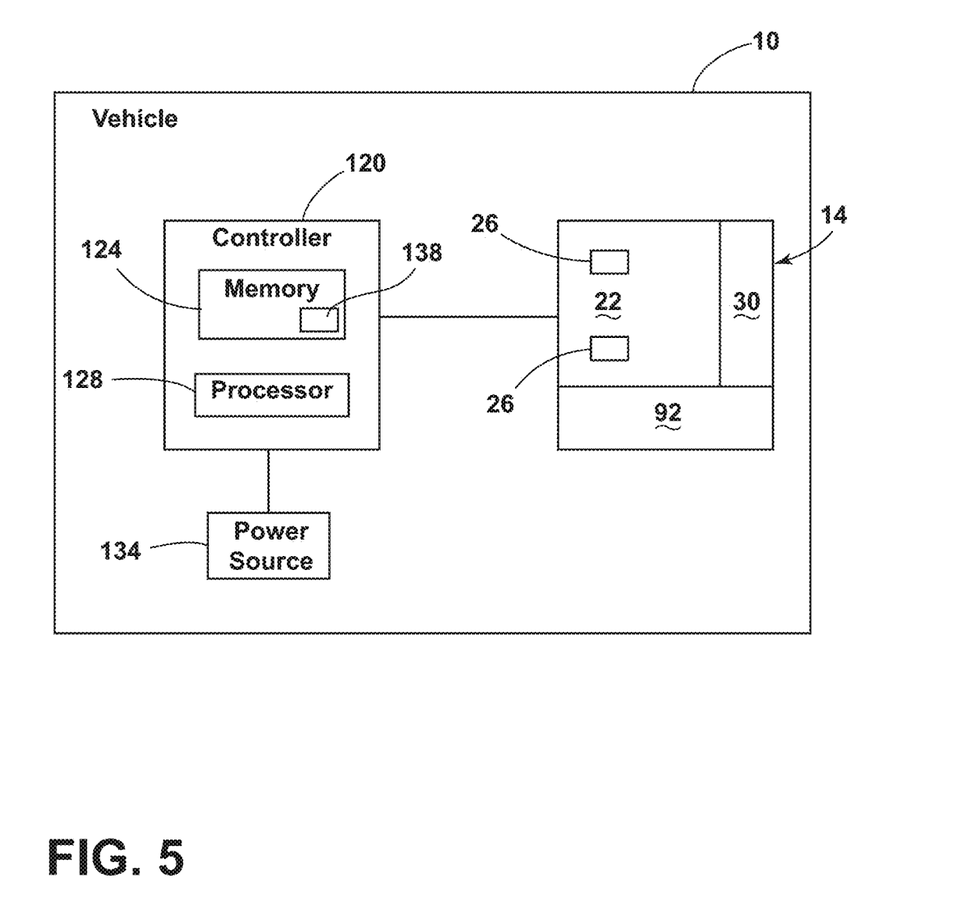
FIG. 5 is a block diagram of the vehicle, according to at least one example.

Referring now to FIG. 5, a box diagram of vehicle 10 is shown in which the visual element 14 is implemented. The vehicle 10 includes a controller 120 in communication with the light sources 26 and the proximity switch assembly 92. The controller 120 may include a memory 124 having instructions contained therein executed by a processor 128 of the controller 120. The controller 120 may provide electrical power to the light sources 26 by a power source 134 located onboard the vehicle 10. The memory 124 may include a variety of light control routines 138 configured to vary the color and intensity emitted by the light sources 26 that may be executed by the controller 120 in response to a user input (e.g., from the proximity switch assembly 92 and/or other buttons or switches around the vehicle 10). For example, the light sources 26 may increase in brightness and/or change color to correspond with various vehicle events (e.g., welcome or farewell events, vehicle start, moving, stationary). In specific examples, the intensity of the light sources 26 may be altered relative to one another in order to make the projected image 90 appear to move or change color as explained above. Further, the intensity and/or color of the light sources 26 may be altered based on a user defined preference for ambient lighting in the interior of the vehicle 10. In another example, the intensity of each of the light sources 26 may be set in a random order, and then pulsed for a random amount of time to create a random sparkling appearance in the insert 116. Light sources 26 producing the projected images 90 may also be activated.

In addition, the controller 120 may be configured to control the light output of one or more of the light sources 26 based on feedback received from one or more vehicle control modules or sensors such as a speedometer, a light sensor and/or a temperature sensor. For example, the light sources 26 may increase in brightness or change color to correspond with operating modes of the visual element 14. In specific examples, the intensity of the light sources 26 may be altered in order to make the projected image 90 appear to move or change color as explained above. Further, the intensity of the light sources 26 of one visual element 14 may be altered relative to the light sources 26 of another visual element 14. For example, when a heated seat example of the visual element 14 is activated, a heated seat off visual element 14 can be enhanced (e.g., color, intensity and/or movement change) such that the heated seat off visual element 14 is enhanced relative to the heated seat on visual element 14 such that is able to be quickly identified. In another example, the memory 124 may include a routine to alternate the color, intensity and/or movement of the visual element 14 based on data sensed from one or more of the sensors. In a first example, sensor data from the light sensor may be utilized to determine the ambient lighting conditions in which the vehicle 10 is present in order to increase or decrease the intensity of the light from the light sources 26 of the visual element 14. Such an example may make the visual element 14 more visible under the current lighting conditions of the vehicle 10. In a second example, speed data from the speedometer may be used to enhance certain visual element 14 to reduce driving distraction. For example, visual elements 14 commonly used by a driver during operation of the vehicle 10 may be enhanced (e.g., intensity, color and/or movement of the projected image 90) to make the appropriate visual elements 14 more visible to the driver while driving. In a third example, temperature data from the temperature sensor may be utilized to enhance the perception of temperature related visual elements 14. For example, if the temperature sensor detects a cold temperature exterior or interior to the vehicle 10, visual elements 14 relating to heating and/or defrosting controls can be enhanced (e.g., change color, movement and/or intensity) to highlight these visual elements 14 to the driver. It will be understood that the visual elements 14 for cooling (e.g., air conditioning, ventilated seats) may be enhanced when the temperature sensor detects hot conditions exterior or interior to the vehicle 10.

Figure 6:
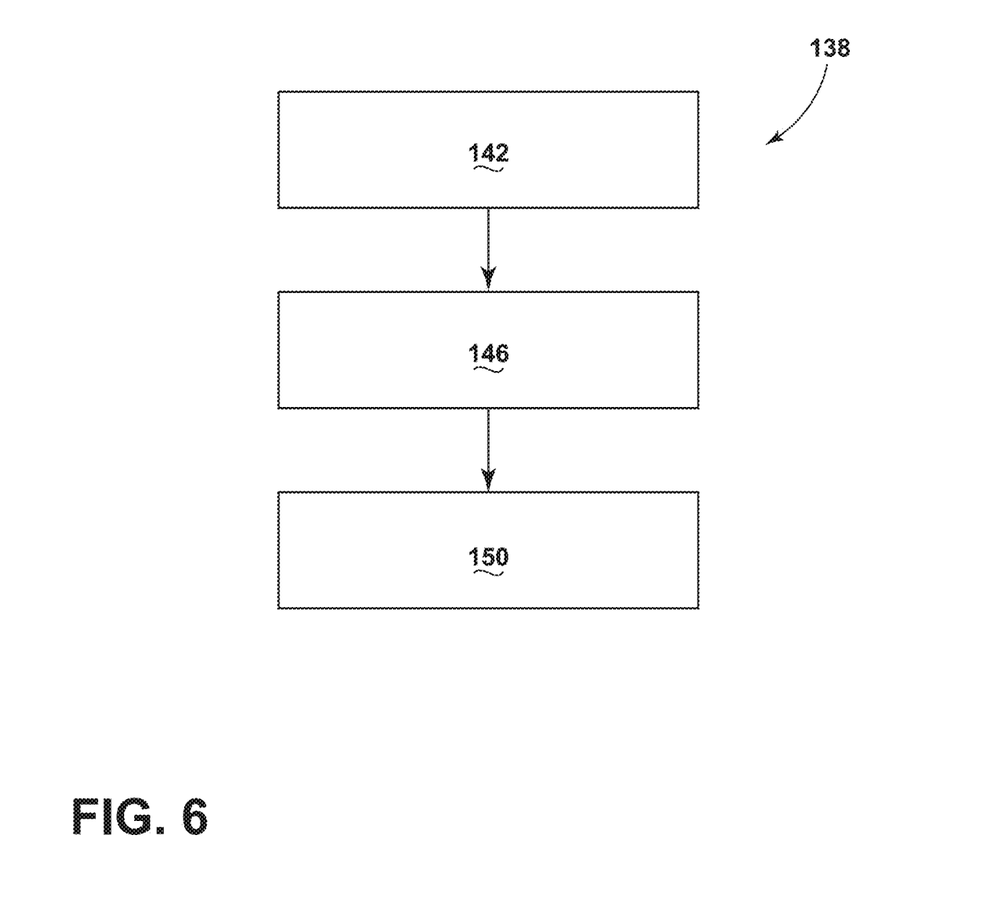
FIG. 6 is a flow chart, according to at least one example.

Referring now to FIG. 6, an exemplary light control routine 138, or method, is depicted. The routine 138 may begin with a step 142 of emitting light in a first pattern from the light source 26 onto the film 30 defining the grating 34. As explained above one or more of the light sources 26 within the lamp cavity 22 may be activated to emit light toward and/or onto the film 30. As the light sources 26 are positioned on an opposite side of the film 30 from the viewer, the film 30 may be said to be backlit.

Next, a step 146 of generating the projected image 90 having a first characteristic from the light of the first pattern through film 30 interacting with the grating 34 is performed. As explained above, the first characteristic may be a color, movement, size, shape, symbol, perceived distance from the film 30 and/or other visual characteristic of the projected image 90. The projected image 90 may be generated on an opposite side of the film 30 than the light source 26.

Next, a step 150 of emitting light in a second pattern onto the film 30 to form the projected image 90 having a second characteristic is performed. In other words, changing of the light pattern emitted by the light sources 26 onto the film 30 changes a characteristic of the projected image 90. For example, the project image 90 may begin or stop moving, change color, change size, change shape, or otherwise be visually different than the project image 90 of the first characteristic. For example, the projected image 90 of the first characteristic may be smaller than the projected image 90 of the second characteristic. In another example, the projected image 90 of the first characteristic is larger than the projected image 90 of the second characteristic. In yet another example, the projected image 90 of the first characteristic has a different color than the projected image 90 of the second characteristic. As explained above, the proximity switch assembly 92 may detect a capacitive signal proximate the visual element 14 and change the projected image 90 between the first characteristic and the second characteristic by changing the light pattern on the film 30 provided by the light sources 26.

Use of the present disclosure may offer a variety of advantages. First, use of the film 30 and/or the gratings 34 and the light sources 26 may provide a projected image 90 which appears to be floating within the insert 116, within the cup well 112 and/or above the film 30. Such a feature may enhance the aesthetic appearance of the visual element 14. Second, use of multiple light sources 26 allows for the projected image 90 to change in appearance through changing intensity, color and/or movement. Third, use of the diffraction examples of the gratings 34 may create a pleasing crystal-like effect. For example, in clear examples of the insert 116 where the gratings 34 are defined on the exterior surface of the insert 116, the diffraction of light by the clear insert 116 may produce a "crystal" like appearance. In examples, where the insert 116 is colored (e.g., black) and the diffraction gratings 34 are defined on the interior surface, a "black quartz" effect may be achieved. Further, the diffraction examples of the grating 34 on the film 30 may give the film 30 and/or the visual element 14 a pleasing crystal appearance. Fourth, use of the visual element 14 in conjunction with vehicle sensors may allow the projected image 90 to vary interactively based on sensed conditions of the vehicle 10. Fifth, use of multiple light sources 26 allows for the projected image 90 to change in appearance or functional identification of the visual element 14, by altering the appearance of the projected image 90 and the visual element 14 through changing intensity, color and/or movement. Sixth, use of the lamp cavity 22 and the backlit orientation of the film 30 may allow for a more compact visual element 14, as well as a more aesthetically pleasing projected image 90. Further, by positioning the light sources 26 behind the film 30 relative to the viewer, new locations where the visual element 14 may be implemented are available.

According to various embodiments, a vehicle visual element, includes a substrate defining a lamp cavity, a light source positioned within the lamp cavity configured to emit light, and a film defining at least one of a holographic and a diffraction grating disposed over the lamp cavity. Embodiments of the vehicle visual element can include any one or a combination of the following features:
    the film is transparent;
    the film defines a diffraction grating;
    the film defines a holographic grating;
    the substrate is a center console substrate;
    the substrate is an interior trim component substrate;
    the substrate is an instrument panel substrate;
    a proximity sensor is positioned proximate the film; and
    a plurality of light sources is positioned within the lamp cavity.

According to various embodiments, a method operating a vehicle visual element may include the steps of: emitting light in a first pattern from a light source onto a film defining a grating; generating a projected image having a first characteristic from the light of the first pattern through film interacting with the grating; and emitting light in a second pattern onto the film to form the projected image having a second characteristic. Embodiments of the method can include any one or a combination of the following features:
    the projected image of the first characteristic is smaller than the projected image of the second characteristic;
    the projected image of the first characteristic is larger than the projected image of the second characteristic;
    the projected image of the first characteristic has a different color than the projected image of the second characteristic;
    the step of generating the projected image further comprises: generating the projected image on an opposite side of the film than the light source; and
    detecting a capacitive signal proximate the visual element and changing the projected image between the first characteristic and the second characteristic.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle visual element, comprising:
 a substrate defining a lamp cavity;
 at least one light source positioned within the lamp cavity and configured to emit light; and
 a film defining at least one of a holographic grating and a diffraction grating disposed over the lamp cavity.

2. The vehicle visual element of claim 1, wherein the film defines a diffraction grating.

3. The vehicle visual element of claim 1, wherein the film defines a holographic grating.

4. The vehicle visual element of claim 1, wherein the substrate is a center console substrate.

5. The vehicle visual element of claim 1, further comprising:
 a proximity switch assembly positioned proximate the film.

6. The vehicle visual element of claim 1, wherein the at least one light source includes a plurality of light sources positioned in a stacked configuration within the lamp cavity.

7. The vehicle visual element of claim 6, wherein the plurality of light sources are positioned in a vertically stacked configuration along a perimeter of the lamp cavity.

8. A visual element for a vehicle, comprising:
 a substrate defining a lamp cavity;
 a film coupled to the substrate and extending over the lamp cavity, wherein the film defines at least one grating;
 a plurality of light sources positioned in a stacked arrangement within the lamp cavity, wherein each of the plurality of light sources is configured to emit light at the at least one grating; and
 a controller configured to independently activate the plurality of light sources.

9. The visual element of claim 8, further comprising:
 a proximity switch assembly coupled to the substrate proximate the film, wherein the controller is configured to selectively activate the plurality of light sources in response to a signal from the proximity switch assembly.

10. The visual element of claim 8, wherein the at least one grating includes first and second gratings spaced-apart from one another.

11. The visual element of claim 8, wherein the at least one grating includes at least one of a diffraction grating and a holographic grating.

12. The visual element of claim 8, wherein the film is transparent.

13. A vehicle visual element, comprising:
 a substrate having a surface and defining a lamp cavity;
 a film disposed over the lamp cavity and flush with the surface of the substrate, wherein the film defines at least one of a holographic grating and a diffraction grating;
 a proximity switch assembly coupled to the substrate adjacent to the lamp cavity; and
 a plurality of light sources positioned within the lamp cavity in a vertically stacked configuration and configured to emit light toward the film.

14. The vehicle visual element of claim 13, wherein the proximity switch assembly is configured as a capacitive sensor having first and second portions spaced-apart from one another by a conductive layer disposed therebetween.

15. The vehicle visual element of claim 13, further comprising:
 a controller configured to independently activate the plurality of light sources in response to a signal from the proximity switch assembly.

16. The vehicle visual element of claim 13, wherein the substrate is an interior trim component substrate.

17. The vehicle visual element of claim 16, wherein the substrate is an instrument panel substrate.

18. The vehicle visual element of claim 13, wherein the light emitted from the plurality of light sources falling on the at least one of a holographic grating and a diffraction grating diffracts into a light field defining a projected image.

19. The vehicle visual element of claim 18, wherein the projected image corresponds with a graphical depiction of a vehicle function.

20. The vehicle visual element of claim 18, wherein the proximity switch assembly emits an electromagnetic field that at least partially extends over the projected image.

* * * * *